(12) United States Patent
Makhervaks et al.

(10) Patent No.: US 9,507,752 B2
(45) Date of Patent: Nov. 29, 2016

(54) METHODS, APPARATUS AND SYSTEMS FOR FACILITATING RDMA OPERATIONS WITH REDUCED DOORBELL RINGS

(71) Applicant: Intel Corporation, Santa Clara, CA (US)

(72) Inventors: Vadim Makhervaks, Austin, TX (US); Kenneth G. Keels, Austin, TX (US); Brian S. Hausauer, Austin, TX (US); Ali S. Oztaskin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1006 days.

(21) Appl. No.: 13/628,771

(22) Filed: Sep. 27, 2012

(65) Prior Publication Data
US 2014/0089444 A1 Mar. 27, 2014

(51) Int. Cl.
*G06F 15/167* (2006.01)
*G06F 15/173* (2006.01)

(52) U.S. Cl.
CPC .............................. *G06F 15/17331* (2013.01)

(58) Field of Classification Search
CPC .................................................. G06F 15/17331
See application file for complete search history.

(56) References Cited

PUBLICATIONS

NVM Express Specification Revision 1.1, Oct. 11, 2012 www.nvmexpress.org.*
NVM Express Specification Revision 1.0e, Jan. 23, 2013 www.nvmexpress.org.*

* cited by examiner

*Primary Examiner* — Vivek Srivastava
*Assistant Examiner* — Nicholas Celani
(74) *Attorney, Agent, or Firm* — Law Office of R. Alan Burnett, P.S (57) ABSTRACT

Methods, apparatus and systems for reducing usage of Doorbell Rings in connection with RDMA operations. A portion of system memory is employed as a Memory-Mapped Input/Output (MMIO) address space configured to be accessed via a hardware networking device. A Send Queue (SQ) is stored in MMIO and is used to facilitate processing of Work Requests (WRs) that are written to SQ entries by software and read from the SQ via the hardware networking device. The software and logic in the hardware networking device employ pointers identifying locations in the SQ corresponding to a next write WR entry slot and last read WR entry slot that are implemented to enable WRs to be written to and read from the SQ during ongoing operations under which the SQ is not emptied such that doorbell rings to notify the hardware networking device that new WRs have been written to the SQ are not required.

25 Claims, 9 Drawing Sheets

METHODS, APPARATUS AND SYSTEMS FOR FACILITATING RDMA OPERATIONS WITH REDUCED DOORBELL RINGS

TECHNICAL FIELD

The field of invention relates generally to computer systems and networking and, more specifically but not exclusively relates to techniques for reducing the use of doorbell rings in connection with remote direct memory access implementations over high-speed networks.

BACKGROUND ART

Remote Direct Memory Access (RDMA) is a direct memory access mechanism that enables a computer to access memory from another computer without involving the computers' operating systems. RDMA supports zero-copy networking by enabling a network adapter to transfer data directly to or from application memory, eliminating the need to copy data between application memory and the data buffers in the operating system. Such transfers require no work to be done by CPUs, caches, or context switches, and transfers continue in parallel with other system operations. When an application performs an RDMA Read or Write request, the application data is delivered directly to the network, reducing latency and enabling fast message transfer.

Current RDMA-enabled network adapters (such as Internet Wide Area RDMA Protocol (iWARP) RDMA Network Interface Controllers (RNICs) or InfiniBand HCAs (Host Channel Adapters) use uncached Memory-mapped input/output (MMIO) writes to the memory mapped adapter address space to notify hardware about posted transmit or receive work queue elements (WQEs). Those MMIO write transactions are called Doorbell Rings (DB Rings). Both InfiniBand and iWARP allow application to communicate with hardware directly from the application address space. This is enabled by supporting numerous hardware queues—Send Queues (SQ) and Receive Queues (RQ) that can be mapped and directly accessed from the application address space. Every time an application posts a new transmit or receive work request (WR), this request is added to the respective SQ or RQ by the user space library supplied by the hardware provider.

Although both iWARP and InfiniBand semantically allow applications to post multiple WRs with a single request, in real deployment scenarios applications rarely use this capability, and frequently provide one WR at a time. Every new WR posted to the hardware queue is usually accompanied by a DB Ring to notify hardware that a new request has been added to the queue. RDMA-enabled network adapters are fairly complex and have to maintain various hardware constructs to allow them to keep track of the state of various hardware resources, such as Queue Pair context (pair of Send Queue and Receive Queue), Memory Region Context, Page Lists, etc. With an increasing number of hardware queues, and other resources, and transition of hardware solutions toward less expensive solutions, many RDMA NICs are migrating toward keeping hardware constructs in the host memory and caching most frequently used, rather than keeping all hardware resources on dedicated on-chip or on-card memories. Increasing processing rate capabilities of RDMA NICs and migration of hardware resources to the host memory make frequent DB Rings followed by hardware construct updates a significant burden to the host platform interface (e.g., a PCIe interface). As a result, reduction or elimination of DB Rings becomes a very important factor in improving performance and WR processing capabilities of RDMA NICs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DESCRIPTION OF THE EMBODIMENTS

Embodiments of methods, apparatus, software, and systems for reducing usage of Doorbell Rings in connection with RDMA operations are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The embodiments disclosed herein define enhancements to the network adapter host interfaces that can greatly reduce the need for Doorbell Rings, improving efficiency and reducing overhead of software-hardware interaction. To better understand the techniques, as well as advantages over existing approaches, a discussion of conventional RDMA host interface techniques is first provided. Following this, details of the embodiments are discussed.

Conventional RDMA Host Interface Techniques

Under conventional RDMA host interface techniques, a status bit is used to indicate that a particular construct has been updated with new information. Traditionally, a producer-consumer model is used to deploy a status bit, wherein a producer sets the status bit to indicate that a particular entry is valid, and the consumer clears the bit to indicate that entry is being or has been processed. This traditional model requires both producer and consumer to write to the same location to set and clear status bit, respectively. The Enhanced Non-Volatile Memory Host Controller Interface (NVMHCI) specification defines a generation status bit approach used for NVM Express (NVMe) Device Completion Queue processing. This technique is an improvement over the traditional producer-consumer model applied for the Completion Queue processing, where the producer hardware only writes a Completion Queue Entry Status bit, and consumer software only reads a Completion Queue Entry Status bit. The meaning of the bit is changed from the valid/non-valid status, to the indication of the current generation. Both producer hardware and consumer software track a current generation, the producer hardware updates the status bit with a current generation, and consumer software reads an entry and compares a value of the Completion Queue Entry Status bit with the expected generation. If the generation matches, then the Completion Queue Entry is valid, otherwise the Completion Queue Entry is considered to be invalid. Generation is changed on a well known location—e.g. first entry, and both producer hardware and consumer software change the current and expected generation when that location is reached. The benefit of the Generation status bit approach applied to Completion Queue processing is elimination of the consumer software write to a Completion Queue Entry to clear the status bit. This keeps a cache line occupied by the Completion Queue Entry from being marked as modified, and does not require to write that cache line back to the memory, improving efficiency of the memory interface.

Alternative current industry solutions involve either employing tracking by hardware to track the location of the last work request posted by software, which in turn requires software to supply this information using a doorbell or other means for each posted Work Request, or having hardware clear a traditional status bit in the Work Request by writing back to the SQ. This is typically a partial cacheline write, and when the rate of such writes gets sufficiently high (as occurs, e.g., in network adapters with bandwidths of 10 Gb/s or greater) there can be a significant performance benefit in eliminating them.

Embodiments for Implementing RDMA with Reduced Doorbell Rings

As discussed above, current approaches implement very frequent Doorbell Rings for facilitating RDMA operations. This results in a significant performance hit, since use of various resources are required for generating and responding to each DB Ring. Under embodiments herein, a generation status bit concept is applied to the SQ WRs along with other novel techniques to reduce the frequency of DB Rings to a minimum, under which software provides a DB Ring to hardware only when a new WR is posted to an empty SQ. Moreover, the techniques combine this aspect with a mechanism that enables hardware polling overhead to be reduced, while avoiding software/hardware race conditions.

Figure 1:
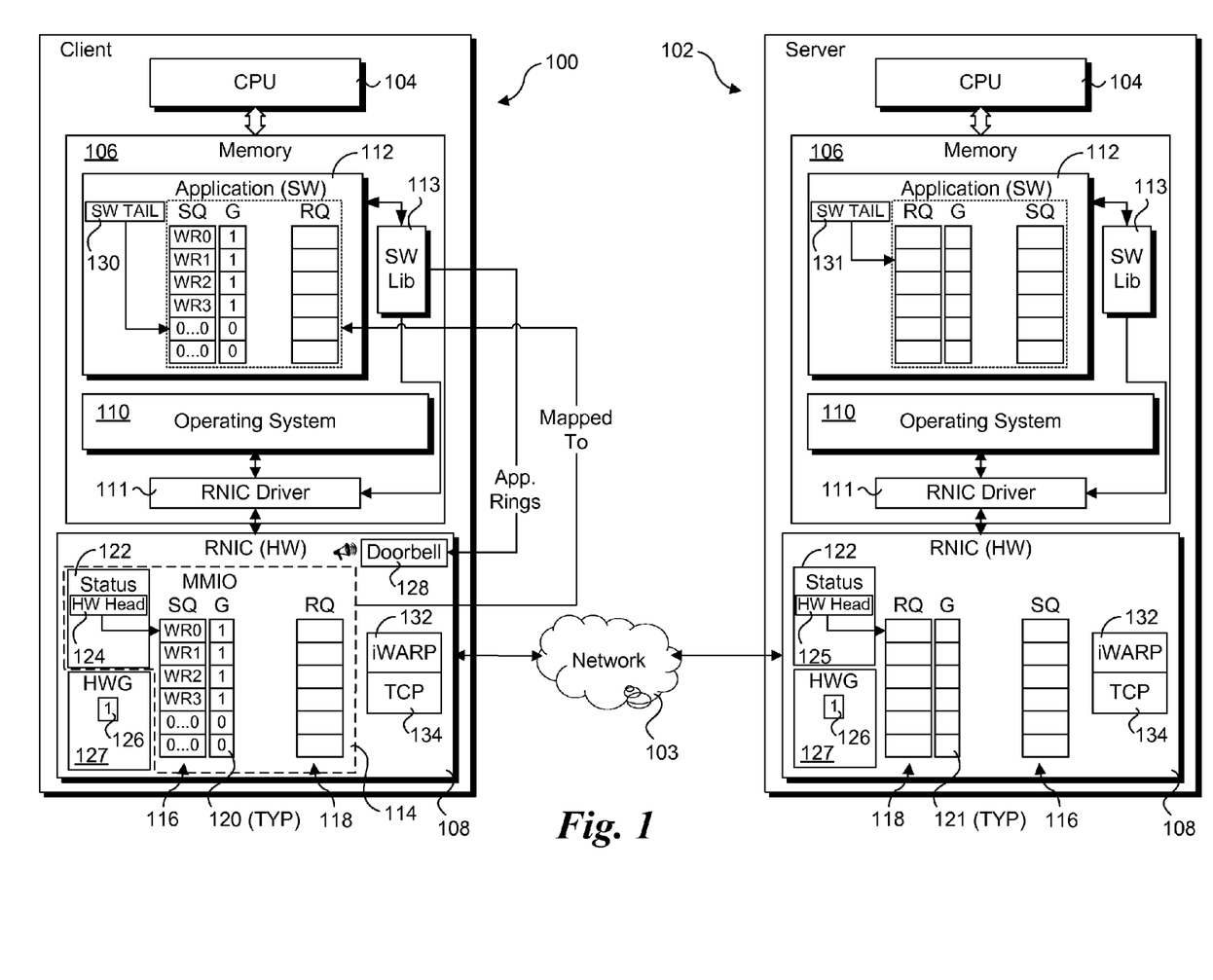
FIG. 1 is a schematic block diagram illustrating an architecture for reducing usage of doorbell rings in connection with RDMA operations, according to one embodiment.

FIG. 1 shows an exemplary implementation system architecture illustrating selected aspects of for facilitating RDMA operations with reduced DB Rings, according to one embodiment. The system includes a client 100 and a server 102 that are configured to support RDMA data transfers over a network 103 using associated hardware and software components, as described herein. Although depicted as a client and server in FIG. 1, the two illustrated devices may also correspond to a pair of peer machines (e.g., computers, servers, etc.) that exchange data using RDMA. Also, the terms "software" and "hardware" may be generally used herein to refer to operations performed by one or more software components or one or more hardware components, without making explicit reference to any particular software or hardware component.

Client 100 includes a Central Processing Unit (CPU) 104 operatively coupled to system memory 106 and an RNIC 108. System memory 106 is also operatively coupled to RNIC 108 via an interconnect, such as but not limited to a Peripheral Component Interconnect Express (PCIe interconnect). System memory 106 is used for storing instructions and data relating to various software components, as depicted by an operating system 110, an RNIC driver 111, an RDMA application 112, and a software (SW) library 113. Prior to being loaded into system memory, software instructions and data used to implement the software components are stored on a storage device such as a disk drive or non-volatile memory (not shown). A portion of the memory address space allocated for RDMA networking application 112 comprises a MMIO address space 114 accessed by RNIC 108. For illustrative purposes, two instances of the same data structures and data are depicted for each of RDMA application 112 and MMIO address space 114; however, it will be recognized that the physical storage for data in the MMIO address space is located in system memory 106 rather than on RNIC 108.

The MMIO address space includes a Send Queue (SQ) 116 comprising a circular buffer including a plurality of WR entry slots, and a Receive Queue (RQ) 118 comprising a circular buffer including a plurality of WR entry slots. There is also a generation ('G') status bit 120 for each WR entry. In addition, RNIC 108 employs a status area 122 including an HW Head pointer 124, which is an index of the last WR processed by RNIC 114, as discussed below. RNIC 108 also includes a HW generation status bit 126 in a hardware context area 127.

In the embodiment illustrated in FIG. 1, RNIC 108 includes an iWARP block 132, and a TCP block 134, which are illustrative of types of protocols which may be implemented in an RNIC. However, these are merely exemplary, as other protocols may also be implemented.

It is noted in the drawings herein, the generation 'G' status bits are depicted separate from the WQ (SQ or RQ) entries. This is for illustrative purposes to emphasis usage of the generation status bits. In general, a generation status bit may be stored as part of a WR in a SQ or RQ entry. In one embodiment the generation status bit is the last bit in a WR.

According to one aspect of the techniques, generation status bits 120 are used for tracking the SQ Work Requests and verifying validity of WRs. The software producer of the request (i.e., software library 112) sets a generation status bit to the current generation value, and the hardware consumer (i.e., RNIC 108) reads and compares the status generation bit with its current generation value. Both the software producer and hardware consumer track a current generation status bit value, and toggle it to a new generation value when reaching a predetermined WR entry location, e.g., the first WR entry slot in the SQ. If a generation status bit in the SQ WR entry matches an expected current generation value, the WR is valid, and can be processed by hardware; otherwise, the WR is not valid.

SQ 116 is accessed by both Software (e.g., software library 113) and Hardware (i.e., RNIC 108). Software library 113 is configured to communication with RNIC driver 111, which provides the software communication interface to RNIC 108. Software library 113 also provides an interface to RDMA application 112 and writes to SQ 116 to post new WRs. Periodically, software library 113 rings Doorbell 128 to notify RNIC 108 about new posted WRs. RNIC 108 reads WRs from SQ 116, and processes them. Each WR posted to SQ 116 carries a valid generation bit, which is used to enable hardware to identify valid WRs. Once each round through the SQ, such as upon returning to the first WR entry slot, software toggles the value of the generation bit. When hardware reads a WR with the generation bit not matching a current generation value, it considers the SQ to be "Empty."

Software library 113 uses information in Status Area 122 to decide whether it has to ring Doorbell 128 to notify RNIC 108 about new WR's posted to SQ 116. In one embodiment, the software rings Doorbell 128 only when a first WR is posted to an empty SQ. Otherwise RNIC 108 will opportunistically read the next WR from the SQ 116 and will process it. RNIC 108 updates the pointer index for HW Head pointer 124 as it processes valid WRs posted to SQ 116.

Assuming the SQ is not emptied during steady-state operation, this algorithm facilitates ongoing RDMA operations with almost no DB Rings. Alternatively, the hardware may update HW Head pointer 124 periodically (e.g. at one or more predetermined locations through SQ 116), rather than only an empty SQ condition is detected by hardware, resulting in eliminating the need for software DB rings under steady state operation during which the SQ never gets empty. This approach also avoids unnecessary excessive reads of the SQ by hardware when the SQ becomes empty.

In some embodiments, SQ's are implemented as circular buffers under which new WR entries for each "round" through an SQ's set of buffered slots overwrite existing WR entries, and WRs are indicated as being processed by Hardware by advancing HW Head pointer 124, which is also referred to herein as the HW_Head index and/or pointer. In actuality, there is no data that is physically removed from a buffer when a WR entry is processed by Hardware, but rather a transfer operation is implemented by copying data specified by the WR entry and inserting the copied data into an applicable RDMA data structure to be transmitted outbound from a port in the Hardware (e.g., an Ethernet port on an RNIC, or an InfiniBand port on an InfiniBand HBA).

To facilitate the foregoing circular buffer scheme, both Software and Hardware maintain strict ordering rules when reading or writing. This is implemented by use of an SW Tail pointer 130 (also referred to as the SW_Tail index or index value) and HW Head pointer 124 (i.e., index), which are incremented such that when a new Software WR entry is written to the buffer location pointed to by SW Tail pointer 130, the SW_Tail index value is incremented, while the next WR entry to be read by Hardware is located via the WR entry associated with the HW_Head index. Accordingly, as new WR entries are written, the SW_Tail index is advanced, while in conjunction with processing a WR entry, Hardware advances the HW_Head index to the next entry. Under this scheme, SW_Tail and HW_Head indexes are reset to 0 at the "end" of the passing through the SQ, returning the buffer slot to the first entry in the SQ.

Figure 2:
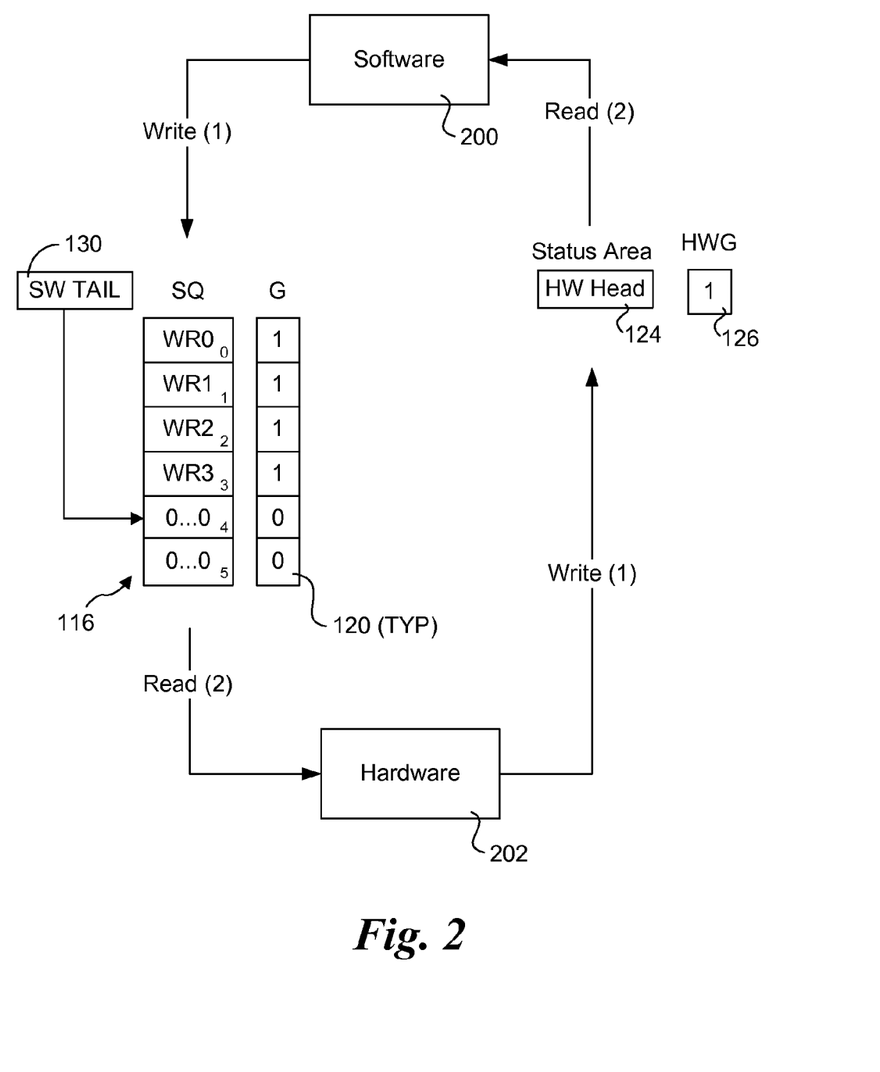
FIG. 2 is a cycle flow diagram illustrating use of exemplary data structures in a MMIO address space accessed by software and hardware to facilitate RDMA operations with reduced doorbell rings, according to one embodiment.

An overview of this process is illustrated in FIG. 2, with more detailed operations shown in the FIGS. 2a-2f and the flowcharts of FIGS. 3, 4a, 4b, and 5. FIG. 2 depicts a circular flow illustrative of ongoing operations performed by Software 200 and Hardware 202 corresponding to an ongoing Software Write—Hardware Read process. Although depicted as a single cycle, the operations performed by Software 200 and Hardware 202 are often asynchronous, and each may perform one or more cycles independent of the other.

During a Software cycle, Software 200 Writes a new WR entry in SQ 116 at a location pointed to be SW Tail pointer 130, and then reads the HW Head pointer 124 index value. For ease of understanding, SQ 116 is depicted as including six WR entry slots, labeled 0-5; however, in practice it is likely SQ 116 will have more than six WR entry slots, such as 16 slots, 24, slots, 32 slots, 64 slots, etc. In conjunction with Writing a new WR entry to slot 0, the value in a corresponding generation bit 120 is toggled (last bit of WR entry), and the index value for SW Tail pointer 130 is incremented by one. When the index reaches the end of SQ 116 (e.g., reaches a value of 5 in this example), the index is reset to 0, thus looping back to the first WR entry slot.

During a Hardware cycle, Hardware 202 reads a WR entry pointed to by HW Head pointer 124 and increments the HW_Head index by one to point to the next WR entry. As with the SW_Tail index, when the HW_Head index reaches the end of SQ 116, the index is reset to 0, thus looping back to the first WR entry slot. In addition, each time the index is returned to zero, the value for HW generation status bit 126 is toggled.

Figure 2A:
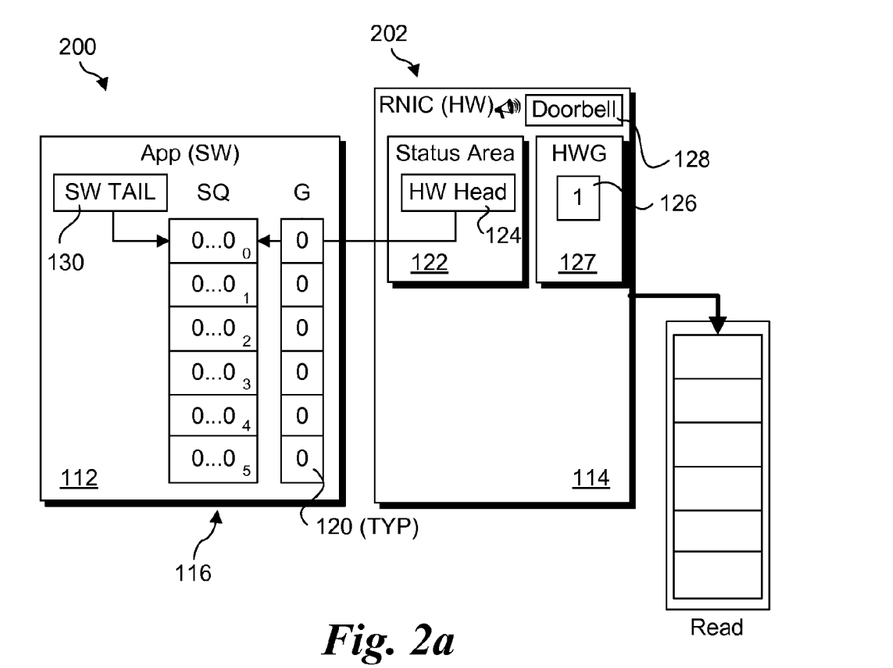
FIGS. 2a-2f illustrated data states of the data structures of FIG. 2 under various operational states.

FIG. 2a shows an initialized state corresponding to one embodiment of the cyclical Software Write—Hardware Read process. In the initialization state, the data for each WR entry slot in SQ 116 is set to '0', along with the WR entry's corresponding generation bit 120. Meanwhile, the HW generation bit is set to '1'. In addition, each of SW Tail pointer 130 and HW Head pointer 124 are indexed to point to the first WR Entry slot in SQ 116 (i.e., slot 0).

Figure 3:
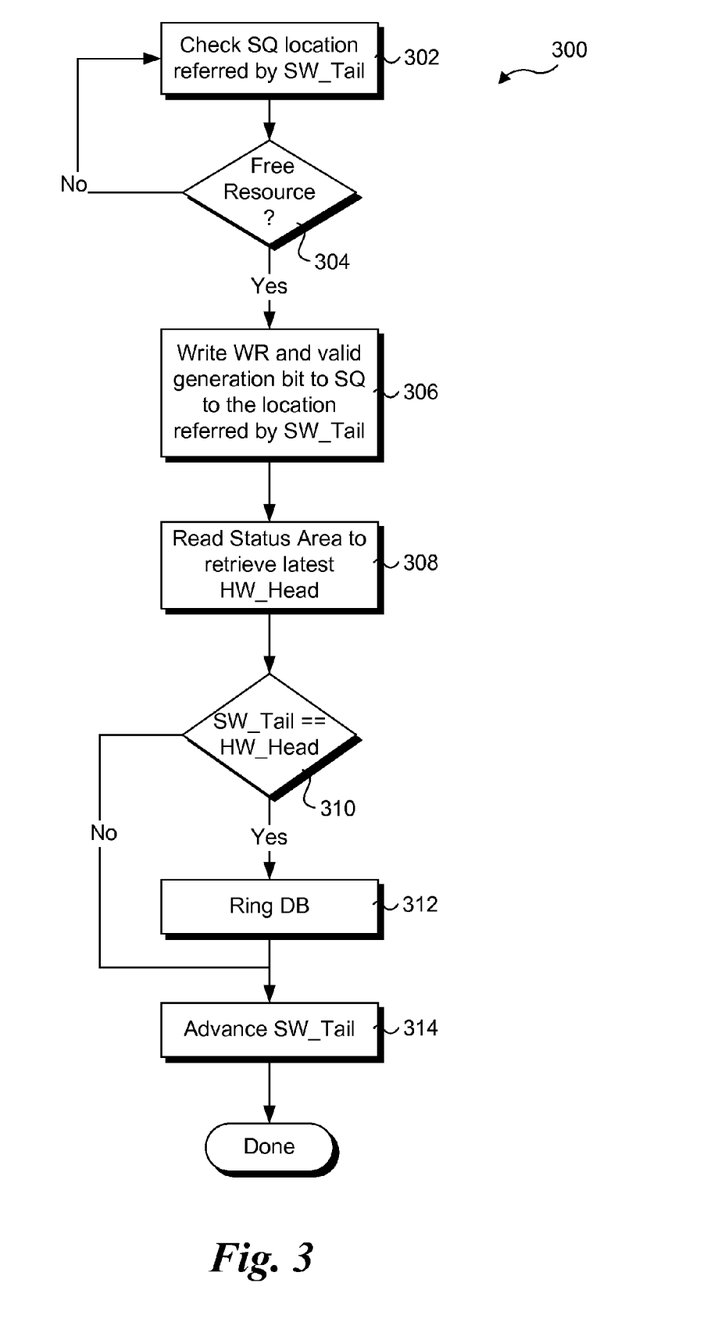
FIG. 3 is a flowchart illustrating operations and logic performed by software in connection with writing WR entries to an SQ and employing doorbell rings when new WR entries have been added after an empty SQ condition is detected.

With further reference the flowchart 300 of FIG. 3, operations performed by Software 200 proceed as follows. Generally, the flow may begin in response to a request from a software producer to transfer data to a destination device using RDMA. In response, a check is made at the location (i.e., SQ entry slot) referenced by SW Tail pointer 130 to determine whether the location corresponds to a free resource, as depicted by a block 302 and a decision block 304. As described below with reference to FIG. 5, during ongoing operations SQ entries will be written by Software and Read by Hardware, and subsequently corresponding data will be successfully sent, enabling resources corresponding to the SQ entries to be released and thus allowing new entries to be written to the SQ. If resources for the WR in the SQ entry slot pointed to by SW Tail pointer 130 have yet to be released, Software 200 cannot overwrite the current WR data in the slot, and thus will periodically poll until the resource is free, as depicted by the arrow looping back to block 302.

Figure 2B:
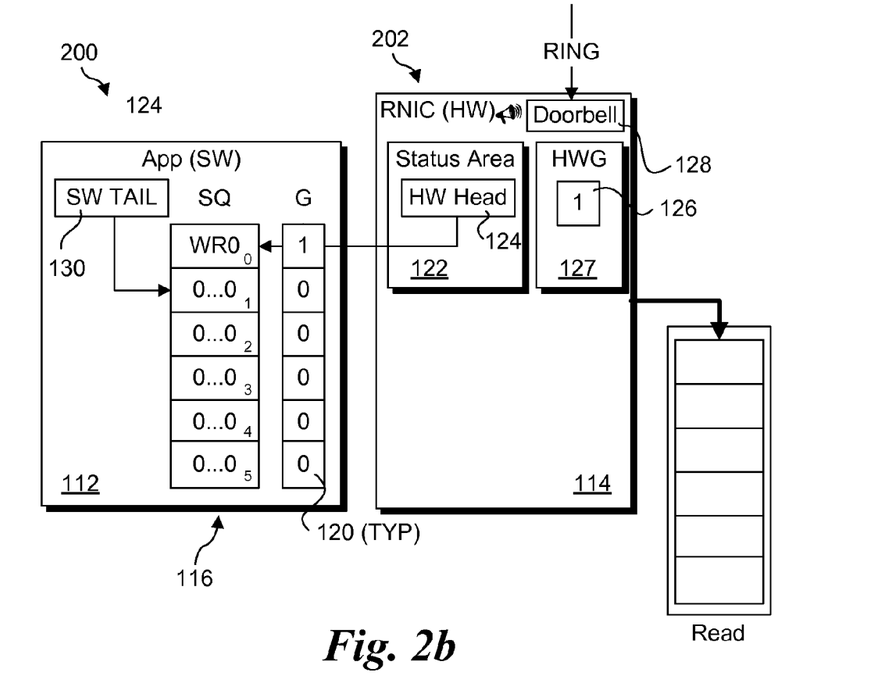

If/once the SQ entry resource is free, Software 200 writes a WR entry with a valid generation bit to SQ 116 at the SQ WR entry slot location pointed to by SW Tail pointer 130, as depicted in a block 306. If the SQ_Tail points to the first entry in SQ 116, the prior valid generation bit value is toggled, and now corresponds to the current valid generation bit value. At the initialization state shown in FIG. 2a, the prior bit value is '0', so the valid generation bit value is toggled to '1'. The state of the various data after this first WR entry Write is shown in FIG. 2b, wherein the WR entry is depicted as WR0 at WR entry slot index 0.

Next, in a block 308, the status area is read to retrieve the current HW Head pointer 124 index value. In a decision block 310 a determination is to made to whether the indexes for SW Tail pointer 130 and HW Head pointer 124 match. If they do, then this indicates a new WR entry has been added to an "empty" SQ, and Doorbell 128 is rang, as shown in a block 312 and as depicted in FIG. 2b. An SQ is considered empty if all of its current WR entries have been read by Hardware 202. The DB Ring is used to notify Hardware 202 that one or more new WRs have been posted to SQ 116, and need to be processed. In one embodiment, the DB is rung for only the first WR posted to an empty SQ. If the SQ is not empty, the indexes for SW Tail pointer 130 and HW Head pointer 124 will not match, and Doorbell 128 will not be rung, resulting in the logic flow skipping block 312. The operations of flowchart 300 are completed in a block 314 by advancing SW Tail pointer 130 to the next index value.

Figure 2C:
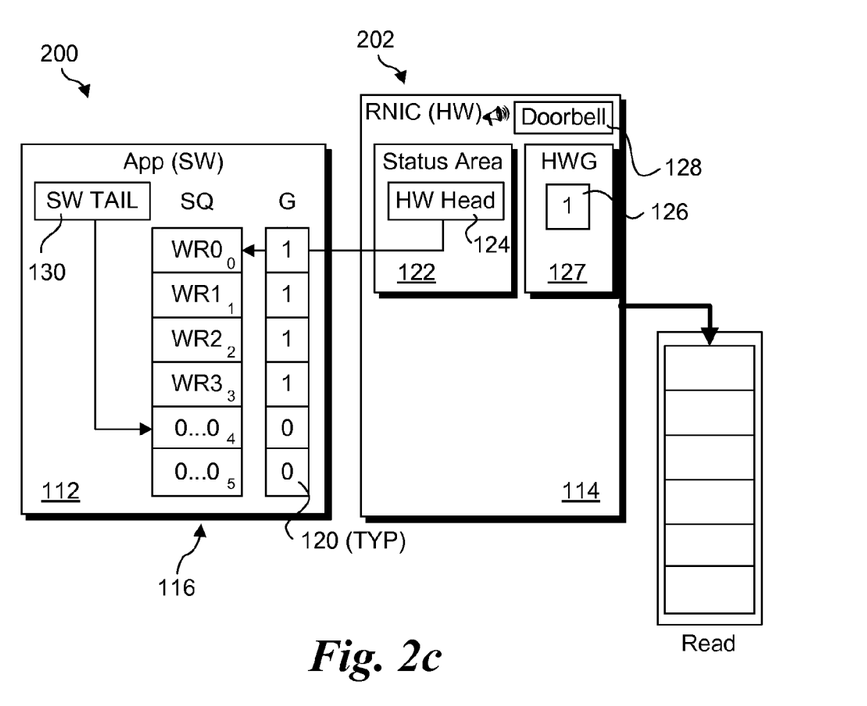
Figure 2D:
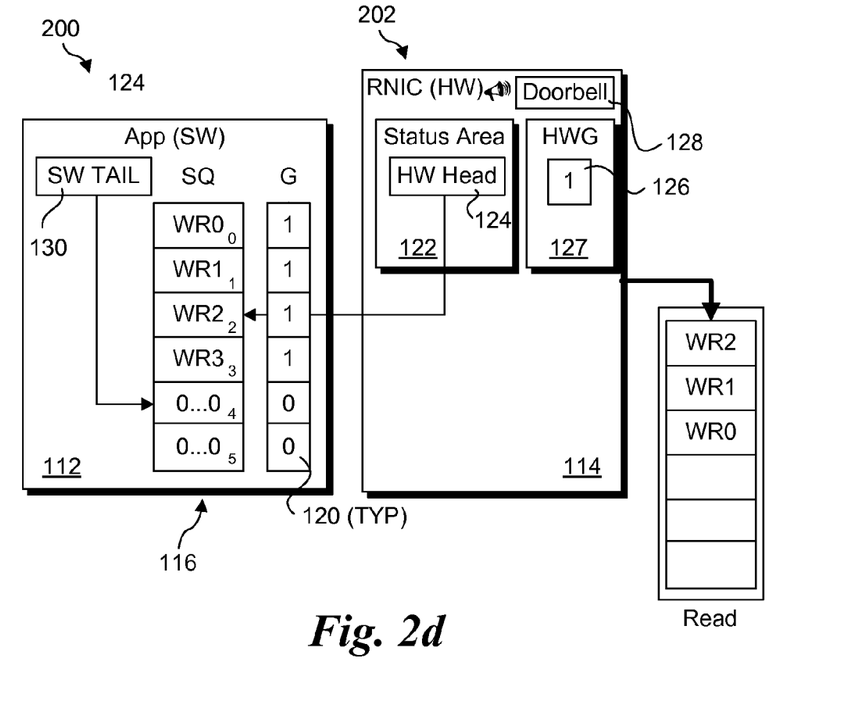

The operations of flowchart 300 are performed in response to corresponding WRs from a software producer, which may issue a request to write multiple WRs. For example, the state of the various data after a request for writing four WRs labeled WR0, WR1, WR2, and WR3 has been serviced by Software is shown in FIG. 2c. Such WR Write requests may be serviced independent of Hardware 202 operations (discussed in detail below).

Figure 4A:
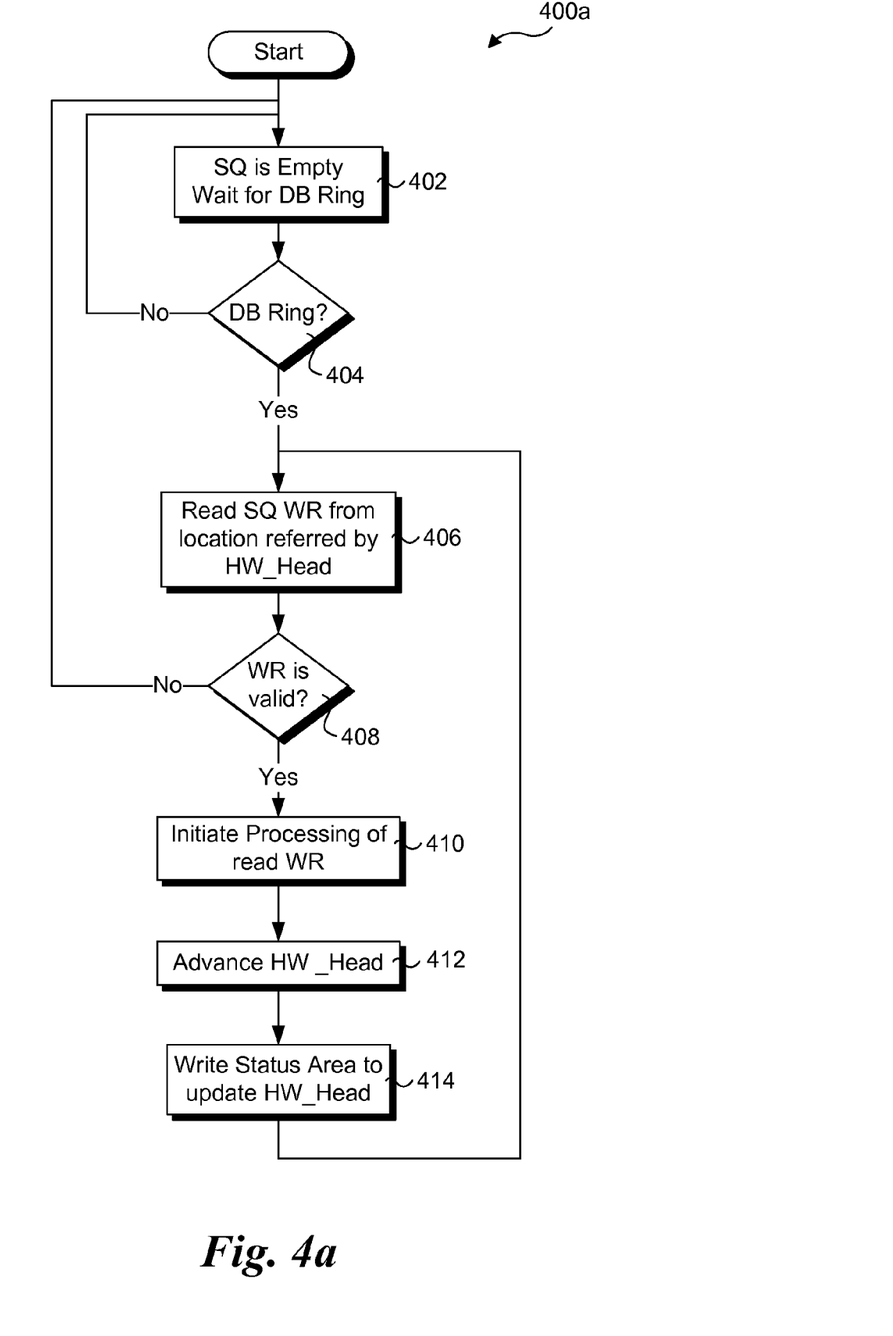
FIG. 4a is a flowchart illustrating operations and logic performed by hardware in connection with reading WR entries and updating data in a status area accessed by software in accordance with a first embodiment of a hardware flow.

FIG. 4a illustrates operations performed by Hardware 200 in accordance with one embodiment of a basic hardware flow. After initialization (as depicted by a Start block and shown in FIG. 2a), SQ 116 will be empty, and the hardware will not do any processing until it receives a DB Ring, as depicted by a block 402 and a decision block 404. In response to a DB Ring, a Read operation of the WR in the SQ WR entry slot pointed to by the HW_head index is then performed in a block 406, including reading the generation status bit 120 for the entry. If the WR entry generation status bit 120 does not match the current value of HW generation status bit 126, as determined at a decision block 408, SQ 116 is empty, and the logic loops the flow back to block 402 to await the next DB Ring. If the WR entry generation status bit 120 matches the current value of HW generation status bit 126, the WR entry is valid, resulting in the processing of the WR being initiated in a block 410 and the HW_Head index being advanced to the next WR entry slot in a block 412. A write to the Status Area is then performed in a block 414 to update the index value for HW Head pointer 124. The logic then loops back to block 406, enabling Hardware to process another WR entry without need for a DB Ring.

Figure 2E:
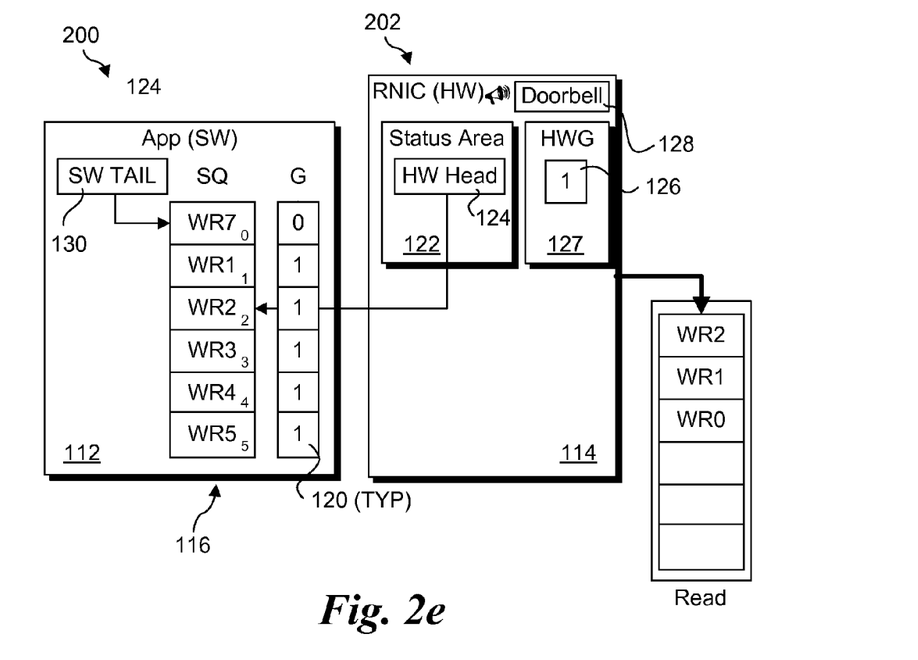
Figure 2F:
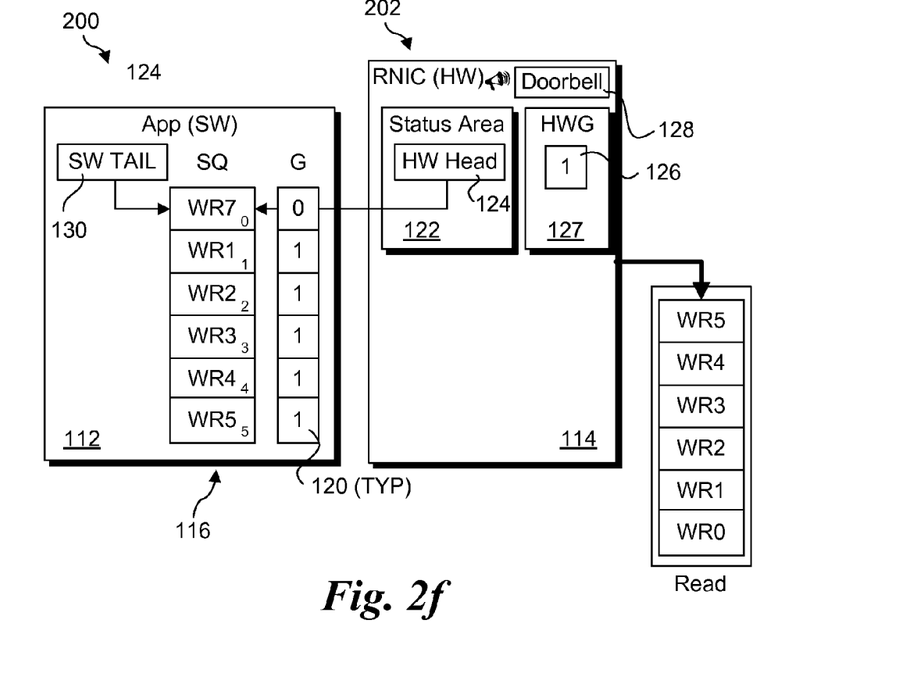

FIG. 2e illustrates HW Head pointer 124 being advanced in conjunction with each WR entry being read by RNIC 114. In addition to updating HW Head pointer 124, Hardware generation status bit 128 is toggled once for each pass through the queue, such as depicted by FIG. 2f wherein the value for Hardware generation status bit 128 is toggled from '1' to '0' upon looping back to WR entry slot 0 in SQ 116.

The basic Hardware flow shown in FIG. 4a and described above is fairly straight forward, and symmetric to the software flow. One of the disadvantages of this flow, however, is that it trades downstream DB rings for every WR posted to the SQ with an upstream HW_Head writeback (i.e., incrementing the HW Head pointer 124 index) by Hardware for every processed WR.

Figure 4B:
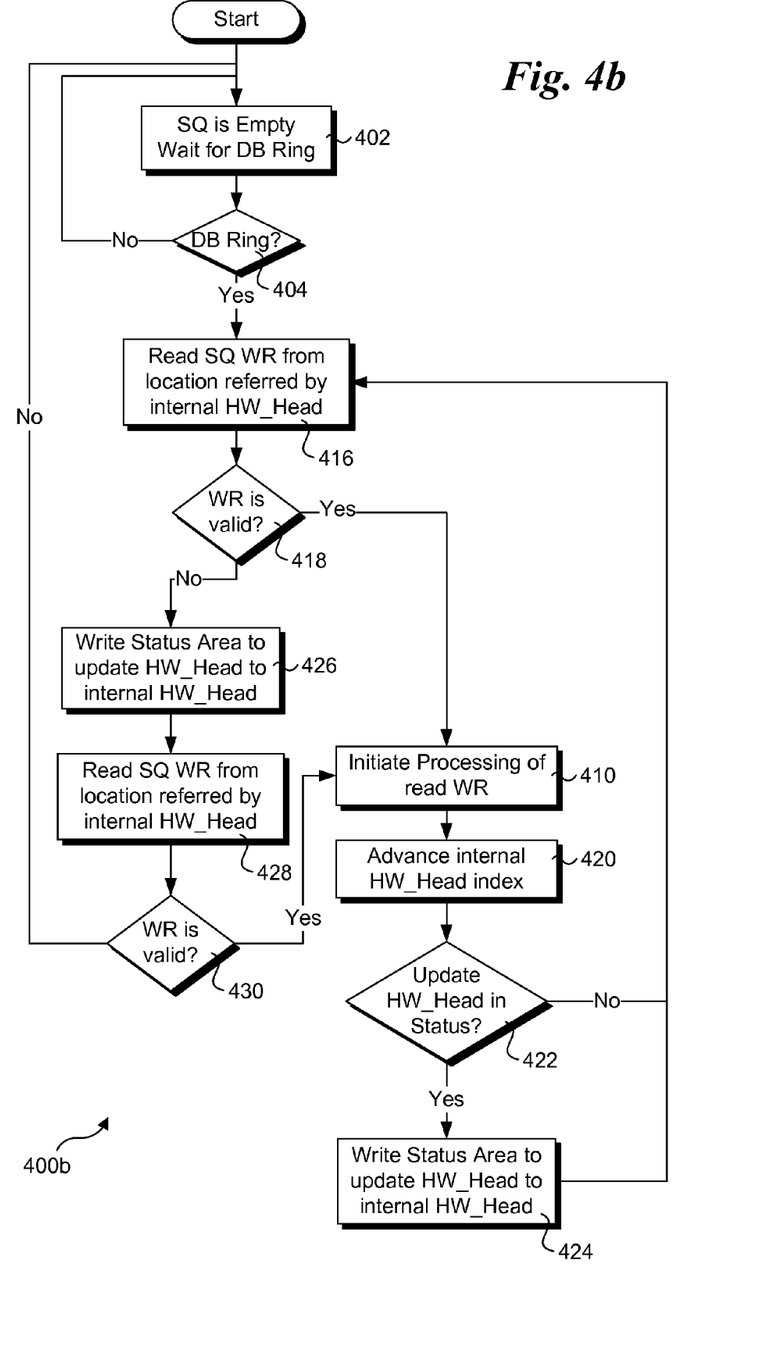
FIG. 4b is a flowchart illustrating operations and logic performed by hardware in connection with reading WR entries and updating data in a status area accessed by software in accordance with a second embodiment of a hardware flow.

Flowchart 400b of FIG. 4b illustrates an enhancement to the basic scheme that further reduces the frequency of the HW_Head writebacks. Under the enhancement, the Hardware maintains an internal (i.e., local) HW_Head index in addition to updating HW Head pointer 124 using writebacks. The internal HW_Head index is similar to HW Head pointer 124, but is advanced via local writes rather than writing updates of the HW_Head index into the MMIO address space, so updating the internal HW_Head index does not require a writeback operation that is sent over an interconnect between the Hardware and the system memory, such as a PCIe memory write transaction.

In general, blocks in FIGS. 4a and 4b perform similar operations and logic. As before, if the SQ is empty, the Hardware waits until it gets a DB Ring (block 402 and decision block 404). In response to a DB Ring, the logic now flows to block 416, which depicts Hardware reading the SQ entry at the WR entry slot referenced by the internal HW_Head index value. If the WR is valid, as determined by a decision block 418, processing of the read WR is initiated in block 410, and the internal HW_Head index is advanced in a block 420.

While it is advantageous to employ an internal HW_Head index, HW Head pointer 124 is still used to determine when the SQ is empty. Accordingly, the internal HW_Head index value is periodically written to update HW Head pointer 124 using a writeback operation. For example, the writeback operation may be based on the internal HW_Head index pointing to one or more predetermined location within the SQ, such as performing a writeback every ½, ¼, or ⅛ way through the SQ entries. The logic for determining when an HW_Head writeback is to occur and performing the writeback operation are depicted by a decision block 422 and a block 424. The logic then flows back to block 416 to read the next SQ WR entry pointed to by the internal HW_Head index.

Returning to decision block 418, if the WR is not valid (e.g., corresponding to an empty SQ condition), a writeback operation is performed in a block 426 to update HW Head pointer 124 with the current internal HW_Head index value. A second WR read and WR validity check for the same HW_Head location is performed, as depicted by a block 428 and a decision block 430. The reason for the second WR read and check is that while HW Head pointer 124 is being updated via the writeback operation, Software may have posted a new WR to the SQ at the WR entry slot pointed to by the internal HW_Head index, which would be missed without the check. If the WR is still invalid (the result if no new WR is posted by Software during the writeback), the empty SQ condition still exists, and the logic is returned to start over again in block 402. If a WR entry is added during the writeback operation, the WR will be valid, causing the logic to proceed to block 410 to initiate processing of the WR.

Figure 5:
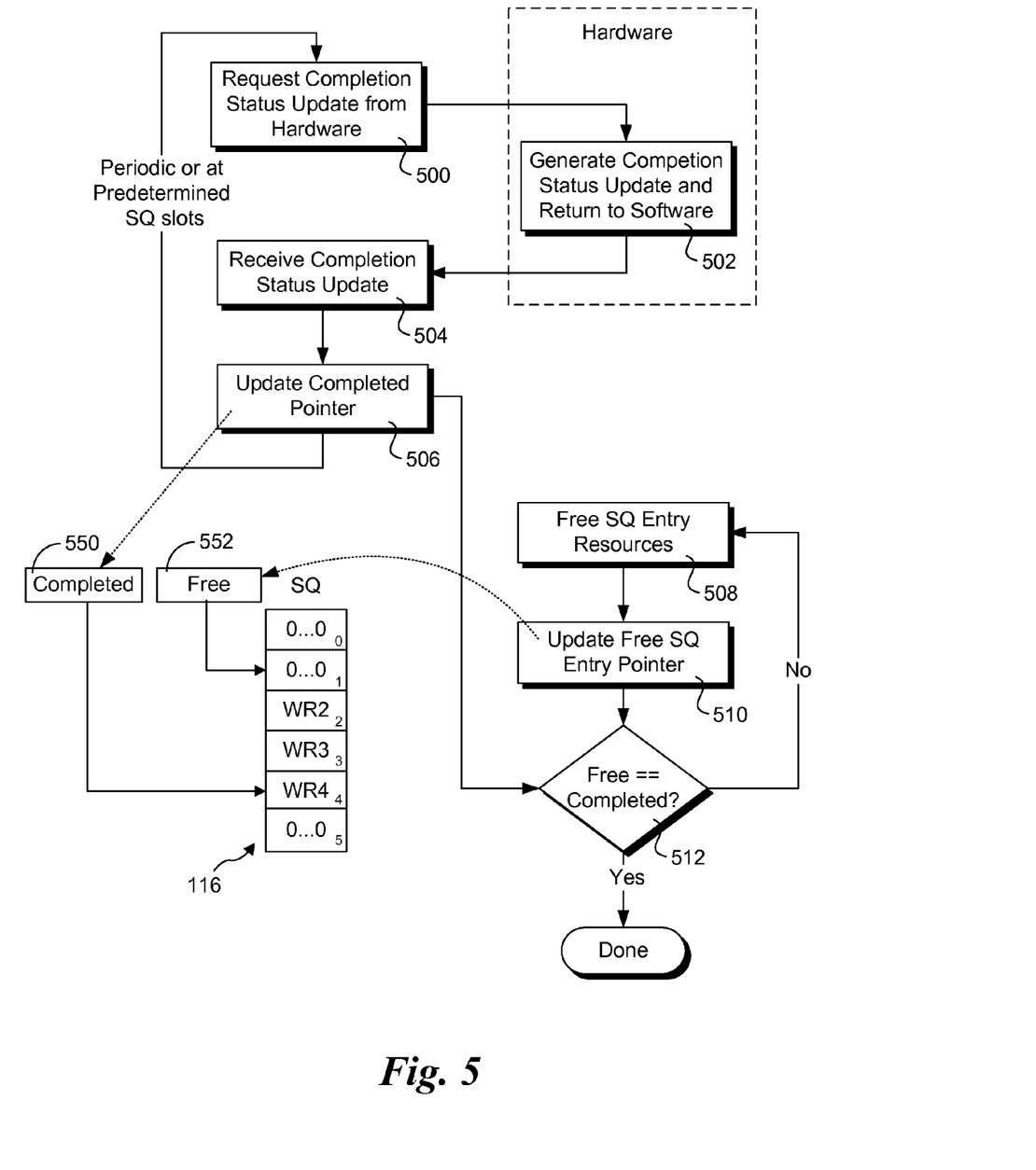
FIG. 5 is a combined flowchart and schematic diagram illustrating operations and logic for implementing hardware completion status updates and releasing of WR entry resources, according to one embodiment.

Returning to flowchart 300 of FIG. 300, as discussed above, Software verifies resources for a given WR entry slot are free (i.e., have been released) prior to posting a WR to that slot. A combined flowchart and schematic diagram depicting operations and logic for managing processing of WRs, including releasing WR resources, is illustrated in FIG. 5.

In the flowchart, the management of WR processing is facilitated via sets of related operations that may generally be implemented in an asynchronous manner. A first set of these operations are depicted in the top portion of FIG. 5. During Hardware processing of a WR, data identified by the WR is read from system memory and is packetized and sent out from the Hardware (e.g., RNIC 108). For protocols that do not verify delivery, such as UDP, once the packets are sent out, the processing is complete. Conversely, for protocols with a delivery verification mechanism such as TCP, a packet may be sent out more than once if an ACK message is not received within a timeout value period. Thus, processing for these types of packets are not considered complete until a corresponding ACK message has been received, verifying successful delivery of the packet. Moreover, resources corresponding to the WR are not to be released until after Hardware completion has been verified. Accordingly, periodically or upon advancing to predetermined SQ slots, software requests completion status updates from hardware, as depicted by blocks 500, 502, and 504. For example, Software may request Hardware completion status updates using a timer, or when the SW_Tail index reaches a predetermined slot, such as every ⅛, ¼, or ½ way through the SQ.

Upon receiving a Hardware completion status update, software updates an internal (to Software) Completed pointer 550 in a block 506. Completed pointer 500 is similar to the SW_Tail and HW_Head indexes, and is used to identify through which WR Hardware has completed processing. Since the WRs are posted and read out in order, in one embodiment the Hardware completion status data is simply an index to the furthest WR in the SQ the Hardware has processed (during a given pass through the SQ).

Once the Software receives the Hardware completion status, it may begin to release resources corresponding to WRs for which Hardware processing has been completed. In the embodiment illustrated in FIG. 5 this is facilitated using a Free pointer 552, which is a second internal (to Software) pointer that is used to point to the last SQ entry for which resources have been released. In general, releasing of WR resources may involve one or more associated Software operations, such a releasing buffers containing data that has been transferred out by Hardware in response to processing the WR entry back to an application or the operating system.

As depicted in the lower right-hand portion of FIG. 5, a second set of operations and logic for releasing SQ entries proceeds as follows. In response to an update of the completed pointer in block 506, the logic will proceed to a decision block 512 to determine whether the Completed and Free pointers 550 and 552 match. Typically, the answer determined by decision block 512 will be False (No) at this entry point, unless the updated completion status for a current request and a previous request are the same (i.e., no update for Completed pointer 550) and all of the WR entry resources up to the Completed pointer index have already been released. In the illustrated example, Completed pointer 550 points to WR entry slot 4, while Free pointer 552 points to WR entry slot 1. Accordingly, the answer to decision block 512 would be no and resources corresponding to the WR entry pointed to by Free pointer 522 would be released in a block 508, and the index value for Free pointer 522 would be indexed in a block 510. The logic may then be repeated iteratively until Free pointer 522 catches up to Completed pointer 550, at which point all of the resources for all of the WR entries for which processing has been completed by Hardware have been released.

The foregoing SQ completion verification and resource release scheme ensures that no SQ entries are overwritten until their resources have been released, thus preventing WRs from being dropped. The scheme also enables Software and Hardware WR processing operations to be performed in an asynchronous manner.

A status generation bit and HW Head and SW Tail pointer scheme similar to that used for WRs in Send Queues may also be employed for processing WRs in Receive Queues. However, under one embodiment there is no need to employ a Doorbell mechanism to indicate valid Work Requests have been posted to the Receive Queue. For example, the Hardware tracks an index of the next RQ entry, and uses the generation bit to identify an empty RQ entry, thus removing the need for a DB Ring.

An exemplary configuration for performing Receive Queue operations with no DB rings is depicted for server 102 in FIG. 1. In a manner similar to that employed for Send Queue WR entries, a generation status bit 121 is employed for each WR entry in RQ 118. Status Area 122 further includes an HW Head pointer 125, while a SW Tail pointer 131 is maintained by Software running on Server 102. However, on the Receive Queue side, Hardware and Software do not employ MMIO scheme, but rather maintain their own respective HW Head 125 and SW Tail pointer 131 separately.

The generation status bit 127 for an RQ WR entry is set by Software to the current generation value, and read by Hardware to be compared with the expected generation value, while the current generation value is changed at known locations (e.g., predetermined RQ WR entry slots) by both software and hardware. If the generation status bit in the current WR read by hardware matches an expected current generation value, this WR is valid, and can be used to place received data to the host memory. If the generation status bit in the current RQ WR does not match an expected current generation value, the RQ is empty, and received packet should be handled by hardware in an appropriate manner, e.g., the packet can be dropped, or the RQ can transition to an error state, depending on the particular implementation decision.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software running on a server or firmware executed by an embedded processor on a network element. Thus, embodiments of this invention may be used as or to support a software program, software modules, firmware, and/or distributed software executed upon some form of processing core (such as the CPU of a computer, one or more cores of a multi-core processor), a virtual machine running on a processor or core or otherwise implemented or realized upon or within a machine-readable medium. A machine-readable medium includes any mechanism for storing or transmitting information in a form readable by a machine (e.g., a computer). For example, a machine-readable medium may include a read only memory (ROM); a random access memory (RAM); a magnetic disk storage media; an optical storage media; and a flash memory device, etc.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for facilitating Remote Direct Memory Access (RDMA) operations via a computer having system memory, comprising: mapping a portion of system memory to a Memory-Mapped Input/Output (MMIO) address space configured to be accessed via a hardware networking device writing, via software, a plurality of Work Requests (WRs) to a Send Queue (SQ) in the MMIO address space; reading, via the hardware networking device, WRs from the SQ; employing a first pointer index identifying a WR entry slot at which a next WR entry is to be written employing, a second pointer index identifying a WR entry slot at which a last WR entry has been read: employing the first and second pointer indexes to determine when the SQ is empty, employing generation indicia indicating a generation status for each of a plurality of WR entries in the SQ; determining whether a WR entry is valid via use of the generation indicia for the WR entry; determining the SQ is not empty; writing one or more new WRs to the SQ; and not providing a notification to the hardware networking device that at least one new WR has been written to the SQ.

2. The method of claim further comprising: initializing a generation status value to a binary value, comprising a '1' or a '0'; and for each of multiple cycles, beginning with a first WR entry slot in the SQ, writing WR entries to the SQ in a sequential order; in conjunction with writing a WR entry to the SQ, setting a generation bit corresponding to the WR entry to a current generation status value; and upon reaching, an end of the SQ, toggling the generation status value and returning to the first WR entry slot to begin a next cycle.

3. The method of claim 1, further comprising: determining the SQ is empty; writing one or more new WRs to the SQ; and providing a notification to the hardware networking device that at least one new WR has been written to the SQ.

4. The method of claim 1, wherein the second pointer index is located in the MMIO address space.

5. The method of claim 4, further comprising: employing a local pointer comprising an index value in the hardware networking device identifying a WR entry slot at which a last WR entry has been read; and performing a hardware writeback operation to a location in the MMIO address space at which an index corresponding to the second pointer index is stored to update the index with the local pointer index value.

6. The method of claim 5, further comprising: performing the hardware writeback operation each time an SQ entry is read from at least one predetermined SQ entry slot in the SQ.

7. The method of claim 1, further comprising; requesting a hardware completion status update; receiving a hardware completion status update identifying an SQ entry index value through which WR hardware processing has been completed; and updating a completion pointer with the SQ entry index value.

8. The method of claim 7, further comprising: releasing resources corresponding to SQ entries for which hardware processes has been completed; and updating a free SQ entry pointer to point to last SQ entry for which resources have been released.

9. The method of claim 8, further comprising preventing a new WR to be posted to an SQ WR entry slot having an WR entry for which resources have not been released.

10. The method of claim 1, wherein the hardware networking device comprises a RDMA Network Interface Controller (RNIC).

11. The method of claim 1, wherein the hardware networking device comprises an InfiniBand Host Channel Adaptor.

12. A computer system, comprising; a processor; system memory, operatively coupled to the processor and have an address space; a hardware networking device, operative coupled to the system memory via an interconnect and having embedded logic; and a storage device, having software instructions stored therein configured to be executed by the processor, wherein the software instructions and the embedded logic are configured to facilitate Remote Direct Memory Access (RDMA) operations during operation of the computer system via execution of the software instructions by the processor and via operation of the embedded logic in the hardware networking device, the RDMA operations including, mapping a portion of the system memory to a Memory-Mapped Input/Output (MMIO) address space configured to be accessed via the hardware networking device; writing a plurality of Work Requests (WRs) to a Send Queue (SQ) in the MMIO address space; reading WRs from the SQ via the hardware networking device, employing a first pointer index identifying a WR entry slot at which a next WR entry is to be written; employing a second pointer index identifying a WR entry slot at which a last WR entry has been read; employing the first and second pointer indexes to determine when the SQ is empty. employing generation indicia indicating a generation status for each of a plurality of WR entries in the SQ; determining whether a WR entry is valid via use of the generation indicia for the WR entry; determining the SQ is not empty; writing one or more new WRs to the SQ; and not providing a notification to the hardware networking device that at least one new WR has been written to the SQ.

13. The computer system of claim 12, wherein the software instructions are configured to perform further operations when executed by the processor comprising: determining the SQ is empty; writing at least one new WR to the SQ; and providing a doorbell ring to the hardware networking device indicating at least one new WR has been written to the SQ.

14. The computer system of claim 12, wherein the second pointer index is located in the MMIO address space.

15. The computer system of claim 14, wherein the embedded logic is configured to perform further operations when operated comprising: employing a local pointer comprising an index value in the hardware networking device identifying a WR entry slot at which a last WR entry has been read; and performing a hardware writeback operation to a location in the MMIO address space at which an index corresponding to the second pointer index is stored to update the index with the local pointer index value.

16. The computer system of claim 15, wherein the embedded logic is configured to perform further operations when operated comprising: performing the hardware writeback operation each time an SQ entry is read from at least one predetermined SQ entry slot in the Q.

17. The computer system of claim 12, wherein the software instructions are configured to perform further operations when executed by the processor comprising: requesting, a hardware completion status update; receiving a hardware completion status update comprising an SQ WR entry index value identifying a WR entry through which hardware processing of WR entries has been completed; and updating a completion pointer with the SQ entry index value.

18. The computer system of claim 17, wherein the software instructions are configured to perform further operations when executed by the processor comprising: releasing resources corresponding to SQ entries for which hardware processes has been completed; and updating a free SQ entry pointer to point to last SQ entry for which resources have been released.

19. The computer system of claim 12, wherein the hardware networking device comprises a RDMA Network Interface Controller (RNIC).

20. A non-transitional machine-readable medium having software instructions stored thereon, configured to be executed by a processor in a computer system having a hardware network device configured to support Remote Direct Memory Access (RDMA) operations during operation of the computer system, wherein, when executed, the software instructions cause the computer system to perform operations comprising: mapping a portion of the system memory to a Memory-Mapped Input/Output (MMIO) address space configured to be accessed via the hardware networking device; writing a plurality of Work Requests (WRs) to a Send Queue (SQ) in the MMIO address space; implementing first and second indexes configured to monitor locations of WR entry writes to the SQ and WR entry reads from the SQ by the hardware networking device and determine when the SQ is empty; employing generation indicia indicating a generation status for each of a plurality of WR entries in the SQ; determining whether a WR entry is valid via use of the generation indicia for the WR entry; determining the SQ is not empty writing one or more new WRs to the SQ; and not providing a notification to the hardware networking device that at least one new WR has been written to the SQ.

21. The machine-readable medium of claim 20, wherein the second index is located in the MMIO address space and execution of the software instructions enables the hardware networking device to update the second index to identify a location of a last WR entry that has been read from the SQ via a writeback operation from the hardware networking device into the MMIO address space.

22. The machine-readable medium of claim 20, wherein the software instructions are configured to perform further operations when executed by the processor comprising: determining the SQ is empty; writing at least one new WR to the SQ; and providing a doorbell ring to the hardware networking device indicating at least one new WR has been written to the SQ.

23. The machine-readable medium of claim 20, wherein the software instructions are configured to perform further operations when executed by the processor comprising: requesting a hardware completion status update from the hardware networking device; receiving a hardware completion status update comprising an SQ WR entry index value identifying a WR entry through which hardware processing of WR entries has been completed; and updating a completion pointer with the SQ WR entry index value.

24. The machine-readable medium of claim 23, wherein the software instructions are configured to perform further operations when executed by the processor comprising: releasing resources corresponding to SQ entries for which hardware processes has been completed; and updating a free SQ entry pointer to point to last SQ entry for which resources have been released.

25. The machine-readable medium of claim 20, wherein the hardware networking device comprises a RDMA Network Interface Controller (RNIC) and a portion of the software instructions comprises an RNIC driver.

* * * * *